United States Patent [19]

Hohman et al.

[11] 4,338,113

[45] Jul. 6, 1982

[54] METHOD FOR CONTROLLING PARTICULATE EMISSIONS

[75] Inventors: Charles M. Hohman, Granville; Mark A. Propster, Gahanna, both of Ohio

[73] Assignee: Owens-Corning Fiberglas Corporation, Toledo, Ohio

[21] Appl. No.: 245,418

[22] Filed: Mar. 19, 1981

[51] Int. Cl.³ ............................................... C03B 1/00
[52] U.S. Cl. ......................................... 65/27; 65/28; 65/134; 165/111; 209/11; 209/45; 209/129; 209/133
[58] Field of Search ...................... 65/27, 28, 62, 134, 65/335; 165/111; 209/11, 45, 47, 129, 130, 133, 285

[56] References Cited

U.S. PATENT DOCUMENTS

| 1,335,758 | 4/1920 | Schmidt | 209/129 |
| 2,560,047 | 7/1951 | York et al. | 209/129 X |
| 2,592,783 | 4/1952 | Aspegren | 165/111 |
| 4,029,572 | 6/1977 | Theodore et al. | 209/11 |
| 4,144,359 | 3/1979 | Zahedi et al. | 427/39 |
| 4,145,202 | 3/1979 | Grodin et al. | 65/28 X |

OTHER PUBLICATIONS

"Application of Electrified Filter Bed Technology to Glass Melting Furnace Emissions", EFB, Inc., 78 Cummings Park, Woburn, Mass. 01801, 5-5-80.

"Proposal for Rental of an EFB Pilot Unit Demonstration System", EFB, Inc., 78 Cummings Park, Woburn, Mass. 01801, 5-5-80.

*Primary Examiner*—Arthur D. Kellogg
*Attorney, Agent, or Firm*—Ronald C. Hudgens; Patrick P. Pacella

[57] ABSTRACT

A process for preheating glass batch ingredients is disclosed. The invention uses a heat exchange method that employs furnace exhaust gases. The exhaust gases are electrically charged and passed through an electrified bed of heat transfer media to remove particulate from the gases. The gases heat the media while the media scrubs the gases. The heated media then is used to preheat glass batch which is fed to a glass melting furnace.

10 Claims, 2 Drawing Figures

METHOD FOR CONTROLLING PARTICULATE EMISSIONS

TECHNICAL FIELD

This invention relates to a process for reducing the particulate emissions in the exhaust gas from a glass melting furnace.

BACKGROUND ART

Methods are known in the art of glass manufacturing for preheating glass batch wherein glass-forming, batch ingredients are brought in direct contact with heated media within a chamber. The particulate or granular glass batch raw materials are brought in particle-particle heat exchange with media that has been heated with an external burner or heated by direct contact with exhaust gases from a glass melting furnace. This method allows the exchange of large quantities of heat economically and uniformly.

The preheating of glass batch at times may generate high particulate emissions in the chamber. These emissions primarily are due to dusting in the chamber. Often there also are particulate emissions in the flue gases exhausting from the glass melting furnace. These emissions primarily are due to glass batch raw materials trapped in the exhaust gases.

DISCLOSURE OF INVENTION

According to this invention, we have provided a means for reducing the particulate emissions in the exhaust gas stream from a glass melting furnace and for preheating of glass batch particulate to be charged to the furnace. The exhaust gas from the glass melting furnace are passed through an electrified filter bed wherein the media of the filter bed is electrically charged. The exhaust gas stream is electrically charged before passing through the electrified bed. The media of the filter bed becomes coated with the charged particulate of the gas stream and clean exhaust gases are vented to the atmosphere.

The exhaust stream also heats the media in the electrified filter bed. The heated, coated media then is introduced into one end of a container such as a cylindrical drum rotatable on an inclined axis. Concurrently, glass batch to be heated is introduced into the other end of the drum. The hot media flow in one general overall direction through the drum and the batch flows in a generally opposite direction through the drum. The media serves to heat the batch and the batch serves to cool the media. The cooled media is recycled back to the electrified filter bed and the preheated batch is fed to the glass melting furnace.

BEST MODE OF CARRYING OUT INVENTION

Our invention includes durable heat transfer media formed of glass batch agglomerates, glass, ceramic, steel, stainless steel, aluminum, gravel or the like.

Figure 1:
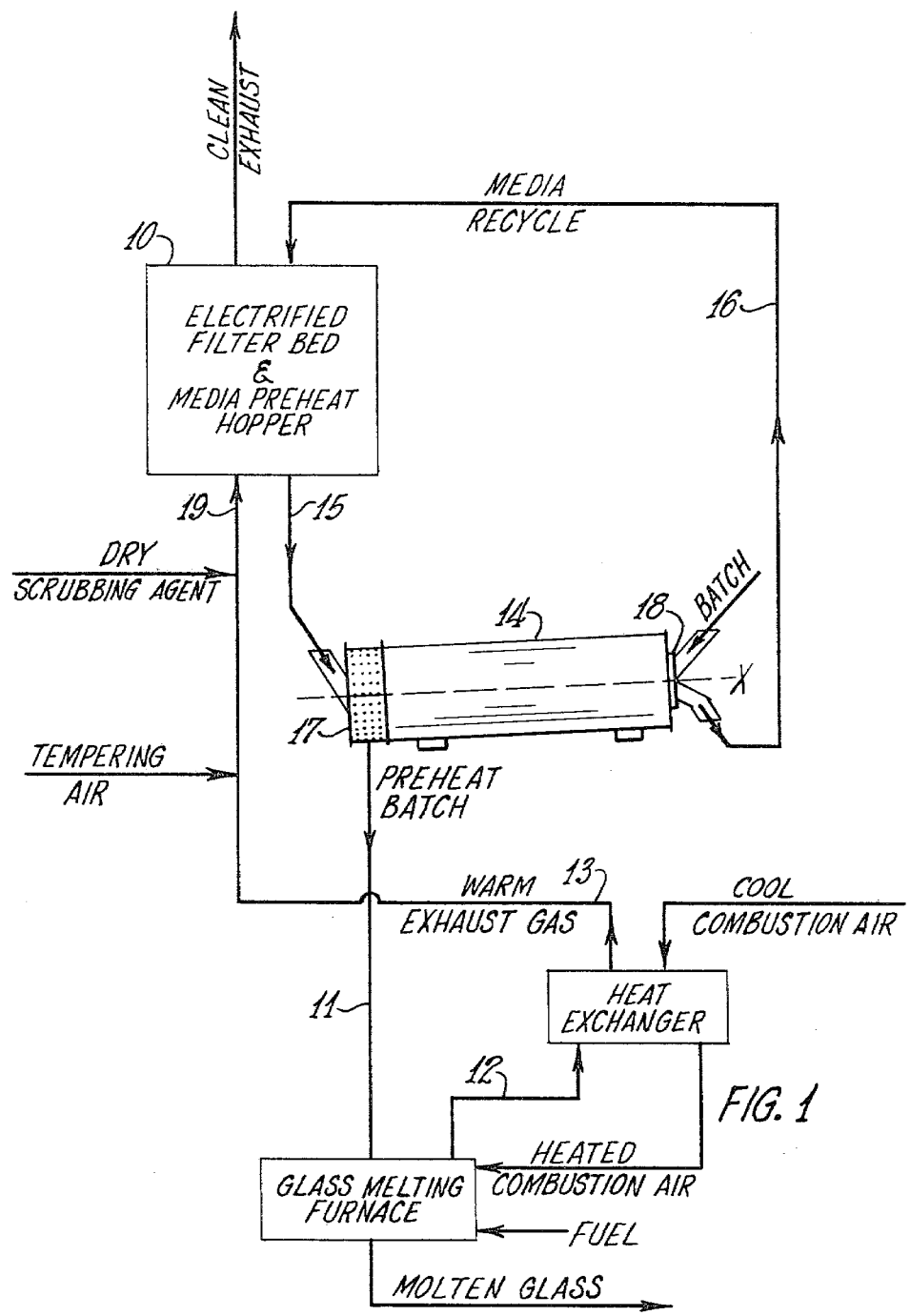
FIG. 1 is a flow diagram of the electrified filter bed and rotary drum heat exchanger in connection with a conventional glass melting furnace.

In FIG. 1, heat transfer media may be heated with flue gases at a temperature normally ranging from 482° to 677° C. from a glass melting furnace in electrified filter bed 10. The flue gases are introduced into the interior of filter bed 10 and the media is introduced into the upper part. The media exits through the bottom of filter bed 10 and the flue gases exit through the top or side. A blower or fan (not shown) may pull the exhaust gases from filter bed 10 or maintain a negative pressure in the bed. The media may be heated to a temperature at or near the temperature of the flue gases.

The hot media then is fed to one end of heat exchange drum 14 via stream 15. Concurrently, particulate glass batch raw materials are fed by a screw feeder (not shown) to the other end of drum 14. Drum 14 is rotated around the axis x—x by a motor and drive (not shown).

Centrally arranged stationary end parts at 17 and 18 form inlet and outlet conduits communicating with the inside of the drum. After the cooled media is discharged from the drum, it is returned to filter bed 10 via stream 16. Hot batch is fed to a glass melting furnace via stream 11.

The hot mixed batch in stream 11 comprises both batch charged to drum 14 and particulate coated on the media in filter bed 10.

Hot exhaust gas 12 from a glass melting furnace is passed through a heat exchanger prior to entering electrified bed 10 as stream 19.

Figure 2:
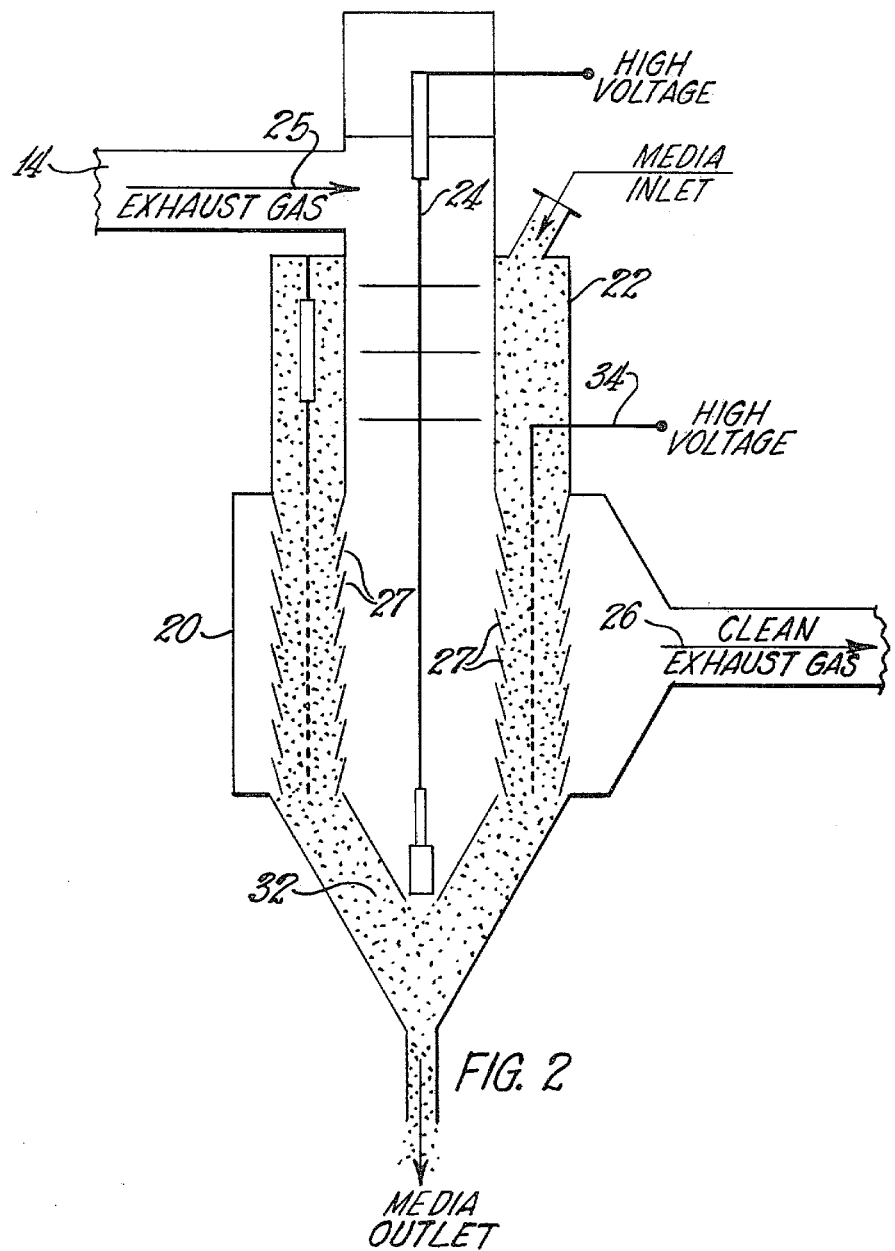
FIG. 2 illustrates the electrified filter bed of this invention in more detail.

In FIG. 2, the flow of exhaust gas 19 through filter bed 10 is shown in greater detail. The basic filter unit of the invention comprises filter 22 and electrical charger 24. Filter 22 is arranged so as to intersect a gas flow path between furnace exhaust gas inlet 25 and clean gas outlet 26. Flow directing baffles 27 are employed in filter 22. A conventional blower or fan (not shown) may be employed to push or pull the gas stream to filter bed 10.

Filter 20 is packed with filter bed medium 32. Filter bed medium 32 generally is a bed of granules such as ceramic spheres. A high voltage supply 34 provides a uniform electric field to the bed.

A suitable electrical charger 24 also is provided. Particulate entrained in exhaust gas 25 is electrically charged when they pass through the region containing electrical charger 24. The electric field formed by high voltage source 34 effectively polarizes the bed media of filter 22, producing caps of positive and negative charges on each medium. The charge caps then act as collection sites for previously charged particulate in exhaust gas stream 25.

A dry scrubbing agent such as CaO or limestone may be employed to react with the volatiles such as boron and fluorine in exhaust gas stream 19. The dry scrubbing agent reacts with the volatiles to form solid particulate reaction products, e.g., calcium borates or calcium, sodium borates. The solids become charged and are removed by collection onto the polarized media.

Frequently, it is desirable to keep the temperature of the exhaust gases in stream 19 below 1000° F. (538° C.). One embodiment for doing this is to blend tempering air with the exhaust gases to obtain the desired temperature as shown in FIG. 1.

Another embodiment, which is not shown, is to separate the electrified filter bed and media preheat hopper into two separate units. In operation, the media of the electrified filter bed becomes coated with collected particulate. When the desired amount of coating has taken place, the coated media is charged to the hopper and preheated. The hot media then is fed to heat exchange drum 14 via stream 15. Warm exhaust gas from the heat exchanger is fed countercurrently to the hopper via stream 19 where the media cools the gases. Exhaust gases from the preheat hopper then flow through the electrified filter bed as shown in FIG. 2. When the electrified filter bed and media preheat hopper are two separate units, multiple streams may be employed for feeding media to the hopper. Also, high voltage source 34 may extend through the preheat hopper to maintain polarization of the media until they pass through the hopper and are fed to heat exchange drum 14.

Tempering air or a dry scrubbing agent may be used as necessary with the two stage embodiment. Either function may be carried before the media preheat hopper or between the hopper and the electrified filter bed depending upon the requirements of the glass melting system and glass batch employed.

INDUSTRIAL APPLICABILITY

In operation, the media of filter bed 22 become coated with collected particulate. When the desired amount of coating and temperature level has taken place, the bed media is removed, and recycled media is introduced continuously. The coated media is removed to heat exchange drum 14 where the particulate is removed from the media and the batch is heated. The media is recycled back to filter bed 10 for reuse. The particulate, which generally is glass batch, is collected and charged with the preheated batch directly to a glass melting furnace via stream 11.

The cylindrical drum typically is inclined at an angle. In the preferred embodiment, the batch charging end of the container is elevated above the media charging end. While the angle can vary widely, generally the drum will form an acute angle with a horizontal line no greater than about 45° and typically less than 15°. Preferably, the angle is less than 5°.

In order to bring the batch in direct contact with the hot media, an arrangement of baffles are attached to the interior of the container. These baffles are 2 to 3 inches wide. These baffles usually are bolted to the walls of the drum and extend the length of the drum. All of the baffles in combination with the rotation of the drum, aid in tumbling the media and batch in direct contact with each other. Typically, cold batch is fed with a screw feeder (not shown) that extends into the interior of the drum. This extension into the drum aids in reducing the amount of batch that may leave the drum with media. In one embodiment, hot media also is fed with a screw feeder (not shown) that extends into the interior of the drum.

While the tumbling of the media and batch occurs through agitation from the baffles and rotation of the drum, movement of the batch and media through the drum is believed to occur in the following manner. The media and batch form gradients in the drum and generally flow downhill in a direction along the gradients and in opposite directions. The batch and media tumble and move over each other as they flow from the high end to the low end of the pile of material in the container.

An embodiment for removing media from the drum comprises an expanded metal scroll that contains over 70% openings or voids. Hole size in the scroll is important as the holes must be big enough to allow batch to fall through. Typically, the holes are similar to a diamond in shape and are 1 inch by ¾ inch in size. As the scroll rotates, the media moves along a spiral path from the cylindrical wall region of the drum to the media exit, which is generally the midregion or center of the drum. The scroll is attached to the drum and rotates with the drum causing the media to move along a spiral path through the scroll to the center of the scroll. The batch falls through the voids of the scroll back into the interior of the drum without being discharged with the media. The screw feeder usually extends past the scroll discharge so that batch will not be charged onto the scroll.

It is while the tumbling of the hot media and batch occurs that the particulate coating on the media from the electrified bed becomes mixed with the batch being heated in the cylindrical drum. Movement of the media through the scroll also strips the coated particles from the media. The combined glass batch is heated in the drum and then charged to the glass melting furnace.

We claim:
1. A process for producing glass by charging to a melting furnace and melting therein a particulate glass batch, including the steps of
   (1) electrically charging a bed of heat transfer media,
   (2) electrically charging dried exhaust gases from the glass melting furnace,
   (3) passing the charged exhaust gases through the electrified bed of media, and p1 (4) bringing the particulate glass batch in direct contact with the heat transfer media to heat the glass batch prior to charging the furnace.
2. A process according to claim 1 wherein the exhaust gases contain particulate which are charged in step (2).
3. A process according to claim 2 wherein the particulate contained in the exhaust gases includes glass batch particulate.
4. A process according to claim 2 wherein the charged particulate is removed from the exhaust gases by coating the media when step (3) is carried out.
5. A process according to claim 4 wherein the particulate coated on the media is removed and charged to the glass melting furnace with the particulate glass batch heated in step (4).
6. A process according to claim 1 wherein step (4) is carried out by moving the particulate glass batch in one direction and moving the media in the opposite direction.
7. A process according to claim 1 wherein step (4) is carried out by charging the heat transfer media to a container, removing hot batch from the container and removing cooled media from the container, wherein the batch is removed at or adjacent one end of the container and the media is removed at or adjacent the other end of the container.
8. A process according to claim 7 wherein the media and batch each form gradients and generally flow downhill in a direction along its gradients.
9. A process according to claim 7 wherein the media is removed from the container by moving along a spiral path through a scroll connected to and located within the container, and communicating with a media exit to the exterior of the container.
10. A process according to claim 7 wherein the media is removed from the container by moving along a spiral path from an outer, interior region of the container to a centrally arranged media exit communicating to the exterior of the container.

* * * * *